Patented Sept. 14, 1948

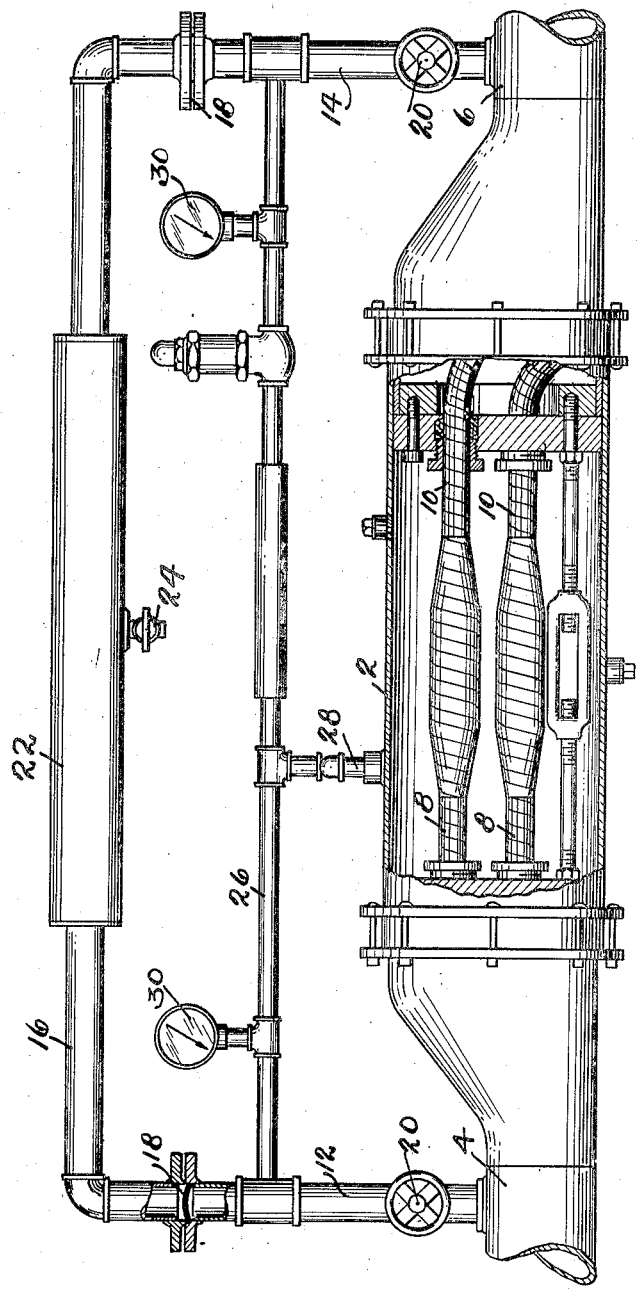

2,449,271

UNITED STATES PATENT OFFICE 2,449,271

JOINT STRUCTURE FOR CABLES

Charles E. Bennett, Ridgewood, and Paul V. White, Rochelle Park, N. J., assignors to The Okonite-Callender Cable Company, Incorporated, Paterson, N. J., a corporation of New Jersey Application November 29, 1945, Serial No. 631,688

4 Claims. (Cl. 174—11)

Our invention relates to an improvement in joint structures for electric cables, with particular reference to joints for Oilostatic electric cables, that is to say to cable systems wherein one or more electrically insulated conductors are sealed in a pipe line which is filled with oil under superatmospheric pressure, conventionally two hundred to two hundred and twenty-five pounds per square inch.

One of the objects of our invention is to provide a joint for electric cables of the general type referred to wherein means are provided for quickly locating an electric fault in the cable, this invention providing at the cable joints a construction whereby the location of the fault with reference to the nearest joint may be quickly determined.

When an electric fault occurs in a liquid immersed cable system such as the Oilostatic system, a very high pressure is instantaneously built up in the immediate vicinity of the fault, creating a momentary pressure impulse or surge, which is accordance with our invention causes a diaphragm located in the system to rupture. Upon the occurrence of a fault in the system, the line is inspected until the ruptured diaphragm is located, which indicates that the fault occurred in that section of the line.

The accompanying drawing illustrates in part sectional elevation a joint structure embodying our invention.

Referring to the drawing in detail, 2 designates the housing of a semi-stop cable joint connecting the two adjacent sections 4 and 6 of a pipe line of an Oilostatic electric cable system. Such a system, as above pointed out, conventionally comprises a plurality of insulated cable conductors 8 and 10, spliced to each other within the joint housing 2, these conductors being loosely enclosed in the pipe line which is kept filled with liquid insulation maintained under superatmospheric pressure.

It is understood that these joints are disposed at intervals along the cable.

As above pointed out one of the objects of our invention is to provide a joint construction whereby the location of an electric fault in the system may be easily determined. Accordingly at each joint we provide a by-pass comprising tubular legs 12 and 14 and cross connection 16. Each of the legs 12 and 14 is provided with a diaphragm 18, designed to rupture under predetermined pressure conditions. The legs 12 and 14 are in constant communication with the interior of the cable pipe line, and between each diaphragm and the pipe line we provide each leg with a gate valve 20. The cross connection 16 is provided with a reservoir 22, equipped with petcock 24.

In addition to the construction so far described we provide by-pass line 26 which extends from the leg 12 to leg 14, and is kept in communication with the interior of the joint housing 2 by connection 28.

The connection of the by-pass line 26 to the legs 12 and 14 is between the valves 20 and diaphragms 18.

The line 26 is equipped with pressure gages 30, one at each side of connection 28.

When this joint equipment is installed, the valves 20 are left open so that each of the legs 12 and 14 is filled with insulating liquid at whatever pressure the system is operated at, say two hundred pounds per square inch. Each of these legs above the diaphragms 18 is empty, as are the cross-connection 16 and reservoir 22.

The by-pass connection 26 will be filled with insulating liquid at the pressure carried on the system, and the pressure gages 30 will indicate this pressure.

Should a leak occur in the pipe line, then there will be a drop in pressure in that particular section of the cable pipe line, which will be indicated by the gage 30 nearest the leak, so that by inspecting the line and noting the gage readings, the location of the leak may be determined within a short distance.

We have found that when an electric fault occurs in the system, such as a short circuit, for example, a very high pressure is built up in the liquid insulating medium in the immediate vicinity of the fault. This creates a pressure impulse or hydraulic surge which is almost simultaneous with occurrence of the fault. This impulse or hydraulic surge is transmitted through the liquid medium to the nearest diaphragm 18 to rupture the same.

Accordingly the liquid insulating medium is then free to flow into the reservoir 22. When the instruments at the central station indicate that a fault has occurred in the line, it is merely necessary to inspect the line by opening the petcocks 24 until finally the reservoir which has been flooded is reached, as indicated by a flow of liquid through the petcock. This reduces the location of the fault to the cable length at each side of that particular reservoir. The valve 20 in the leg 12 for example, may then be closed, but if the flow of insulating liquid through petcock 24 continues it is obvious that the fault is not at that side of the joint, the diaphragm 18 obviously being intact. Closure of the valve 20 in the other leg 14 will check this so that the fault must necessarily be in the cable length nearest the diaphragm in the leg 14.

It will be seen from all of the foregoing that our invention provides an improved joint structure for cable systems of the liquid immersed type, wherein means are provided for quickly locating an electric fault in the system, and for quickly locating a leak.

It is to be understood that changes may be made in the details of construction and arrangement of parts hereinabove described within the purview of our invention.

What we claim is:

1. The combination of an electric cable system embodying an insulated conductor immersed in an insulating liquid enclosed in a pipe line under superatmospheric pressure, of a joint structure comprising a joint housing uniting adjacent ends of two lengths of said pipe line, a by-pass around said joint housing comprising a pair of tubular legs communicating with the pipe line at each side of the joint housing, a normally empty cross connection between said legs, a rupturable diaphragm in each leg between the cross connection and the pipe line adapted to be ruptured by a pressure impulse produced in the insulating liquid by an electrical fault, a valve for each leg intermediate the diaphragm and pipe line, and means for draining said cross connection with either of said valves closed, thereby to determine which diaphragm has been ruptured.

2. The combination of an electric cable system embodying an insulated conductor immersed in an insulating liquid enclosed in a pipe line under superatmospheric pressure, of a joint structure comprising a joint housing uniting adjacent ends of two lengths of said pipe line, a cross connection around said joint housing in communication with the pipe line at each side of the joint housing, a diaphragm in said cross connection at each side of said joint housing, a normally empty reservoir in said cross-connection intermediate said diaphragms, a valve in said cross connection at each side of the joint housing intermediate the diaphragm and the pipe line, said diaphragms being rupturable by a pressure impulse produced in the insulating liquid by an electric fault to permit insulating liquid to flow into the reservoir, and means for draining said reservoir, whereby by closing one of said valves and opening said drain the ruptured diaphragm will be indicated and the cable length in which the fault has occurred determined.

3. The combination of an electric cable system embodying insulated conductors immersed in an insulating liquid enclosed in a pipe line under superatmospheric pressure, a joint structure sectionalizing the cable and comprising a joint housing uniting adjacent ends of adjacent pipe lengths, said conductors being spliced together within said joint housing, a cross connection around said joint housing in communication with the pipe line at each side of the housing, a diaphragm in said cross connection at each side of the joint housing, a reservoir in said cross connection intermediate said diaphragms, a shut-off valve in said cross-connection at each side of the joint housing intermediate the diaphragms and the immediately adjacent pipe line, a by-pass connection in said cross-connection from one side of the joint housing to the other and entering the cross-connection between each of said valves and the corresponding diaphragm, and pressure gages in said by-pass connection, said diaphragms being rupturable by a pressure impulse produced in the insulating liquid by an electric fault, whereby by manipulation of said valves the location of a leak or of an electric fault with respect to the joint may be determined.

4. The combination of an electric cable system embodying an insulated conductor immersed in an insulating liquid enclosed in a pipe line, of a joint structure comprising a joint housing uniting adjacent ends of two lengths of pipe, a by-pass around said joint housing comprising a pair of tubular legs communicating with the pipe line at each side of the joint housing, a normally empty cross-connection between said legs, a rupturable diaphragm in each leg between the pipe line and said cross-connection adapted to be ruptured by a pressure impulse produced in the cable by an electrical fault to permit insulating liquid to flow into the cross-connection, a normally open valve in each of said legs intermediate the diaphragm and pipe line, and draining means operable with either of said valves closed for draining said cross connection, whereby a ruptured diaphragm may be located by opening said drain and closing either of said valves while the other is left open.

CHARLES E. BENNETT.
PAUL V. WHITE.

REFERENCES CITED

The following references are of record in the file of this patent:

UNITED STATES PATENTS

| Number | Name | Date |
|---|---|---|
| 1,918,036 | Hilliard | July 11, 1933 |
| 1,933,348 | Shanklin | Oct. 31, 1933 |
| 2,043,227 | Bennett | June 9, 1936 |